US010720158B2

(12) United States Patent
Kerr

(10) Patent No.: US 10,720,158 B2
(45) Date of Patent: Jul. 21, 2020

(54) LOW POWER DETECTION OF A VOICE CONTROL ACTIVATION PHRASE

(71) Applicant: Imagination Technologies Limited, Kings Langley (GB)

(72) Inventor: Benjamin James Kerr, Northampton (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

(21) Appl. No.: 16/140,799

(22) Filed: Sep. 25, 2018

(65) Prior Publication Data

US 2019/0027145 A1  Jan. 24, 2019

Related U.S. Application Data

(63) Continuation of application No. 15/699,190, filed on Sep. 8, 2017, now Pat. No. 10,115,397, which is a continuation of application No. 14/663,583, filed on Mar. 20, 2015, now Pat. No. 9,767,798.

(30) Foreign Application Priority Data

Feb. 27, 2015 (GB) .................................. 1503285.7

(51) Int. Cl.
*G10L 15/22* (2006.01)
*G10L 15/28* (2013.01)
*G10L 15/08* (2006.01)

(52) U.S. Cl.
CPC ............. *G10L 15/22* (2013.01); *G10L 15/28* (2013.01); *G10L 2015/088* (2013.01); *G10L 2015/223* (2013.01)

(58) Field of Classification Search
CPC ......... G10L 15/00; G10L 15/02; G10L 15/22; G10L 15/28; G10L 2015/088; G10L 2015/223
USPC ............................................... 381/56, 58, 110
See application file for complete search history.

(56) References Cited

U.S. PATENT DOCUMENTS

| 5,623,533 | A | 4/1997 | Kikuchi et al. |
| 5,774,841 | A | 6/1998 | Salazar et al. |
| 6,564,185 | B1 | 5/2003 | Miyazawa et al. |
| 8,340,968 | B1 * | 12/2012 | Gershman ............. G09B 19/06 434/156 |
| 2006/0122831 | A1 | 6/2006 | Jeong et al. |
| 2009/0106027 | A1 | 4/2009 | Teranishi et al. |
| 2009/0299751 | A1 | 12/2009 | Jung |

(Continued)

FOREIGN PATENT DOCUMENTS

| CN | 1819016 A | 8/2006 |
| CN | 101315770 A | 12/2008 |

(Continued)

*Primary Examiner* — William A Jerez Lora
(74) *Attorney, Agent, or Firm* — Potomac Law Group, PLLC; Vincent M DeLuca

(57) ABSTRACT

Methods of low power detection of an activation phrase are described. A microphone system comprises dedicated hardware logic for detecting a pre-defined activation phrase in an audio stream received via a microphone. If the pre-defined activation phrase is detected, the hardware logic sends a trigger signal to activate a module, such as a main speech detection module, which is external to the microphone system and which may be in a low power standby state.

20 Claims, 4 Drawing Sheets

(56) References Cited

U.S. PATENT DOCUMENTS

| | | | |
|---|---|---|---|
| 2013/0060571 A1 | 3/2013 | Soemo et al. | |
| 2013/0110511 A1* | 5/2013 | Spiegel | G10L 15/22 704/243 |
| 2013/0289994 A1 | 10/2013 | Newman et al. | |
| 2014/0122087 A1 | 5/2014 | Macho | |
| 2014/0156269 A1 | 6/2014 | Lee et al. | |
| 2014/0222436 A1 | 8/2014 | Binder et al. | |
| 2014/0257813 A1 | 9/2014 | Mortensen | |
| 2014/0337036 A1* | 11/2014 | Haiut | G10L 15/20 704/275 |
| 2014/0365225 A1 | 12/2014 | Haiut | |
| 2015/0039303 A1 | 2/2015 | Lesso et al. | |
| 2016/0100043 A1 | 4/2016 | Hillier | |
| 2016/0118062 A1 | 4/2016 | Usher | |
| 2016/0179462 A1 | 6/2016 | Bjorkengren | |

FOREIGN PATENT DOCUMENTS

| | | |
|---|---|---|
| CN | 104038864 A | 9/2014 |
| CN | 104050973 A | 9/2014 |
| WO | 2012025784 A1 | 3/2012 |
| WO | 2015005927 A1 | 1/2015 |

* cited by examiner

LOW POWER DETECTION OF A VOICE CONTROL ACTIVATION PHRASE

BACKGROUND

Many consumer devices, including smart phones, televisions, navigation systems and game consoles, can now be controlled by voice in addition to more standard input mechanisms such as touch, buttons or separate controller devices. In some devices, the voice control is enabled through the pressing of a particular control (e.g. a voice control button on a television's remote control or a soft control on the screen of a smart phone) and in some devices the voice control can be triggered (in addition to, or instead of, through the pressing of a control) through the use of an activation phrase (e.g. "Hey Siri™", "OK Google™", "Hey Cortana™" or "computer"). In some examples the voice control can be used to control one or more applications running on the device (e.g. a search application) and in other examples, the voice control can be used more generally to control the operation of the device.

The embodiments described below are not limited to implementations which solve any or all of the disadvantages of known devices which can be voice controlled.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Methods of low power detection of an activation phrase are described. A microphone system comprises dedicated hardware logic for detecting a pre-defined activation phrase in an audio stream received via a microphone. If the pre-defined activation phrase is detected, the hardware logic sends a trigger signal to activate a module, such as a main speech detection module, which is external to the microphone system and which may be in a low power standby state.

A first aspect provides a microphone system comprising a microphone and hardware logic configured to detect a pre-defined phrase in an audio stream received via the microphone and in response to detecting the pre-defined phrase, to send a trigger signal to activate a module external to the microphone system.

A second aspect provides a battery powered computing device comprising a microphone system as described herein.

A third aspect provides a method of operating a microphone system comprising: detecting an audio stream using a microphone in the microphone system; analysing the audio stream to detect a pre-defined phrase using dedicated hardware in the microphone system, the dedicated hardware being configured to detect the pre-defined phrase in an input audio stream; and in response to detecting the pre-defined phrase, sending a trigger signal to activate a module external to the microphone system.

The hardware components described herein may be generated by a non-transitory computer readable storage medium having encoded thereon computer readable program code.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which.

Figure 1:
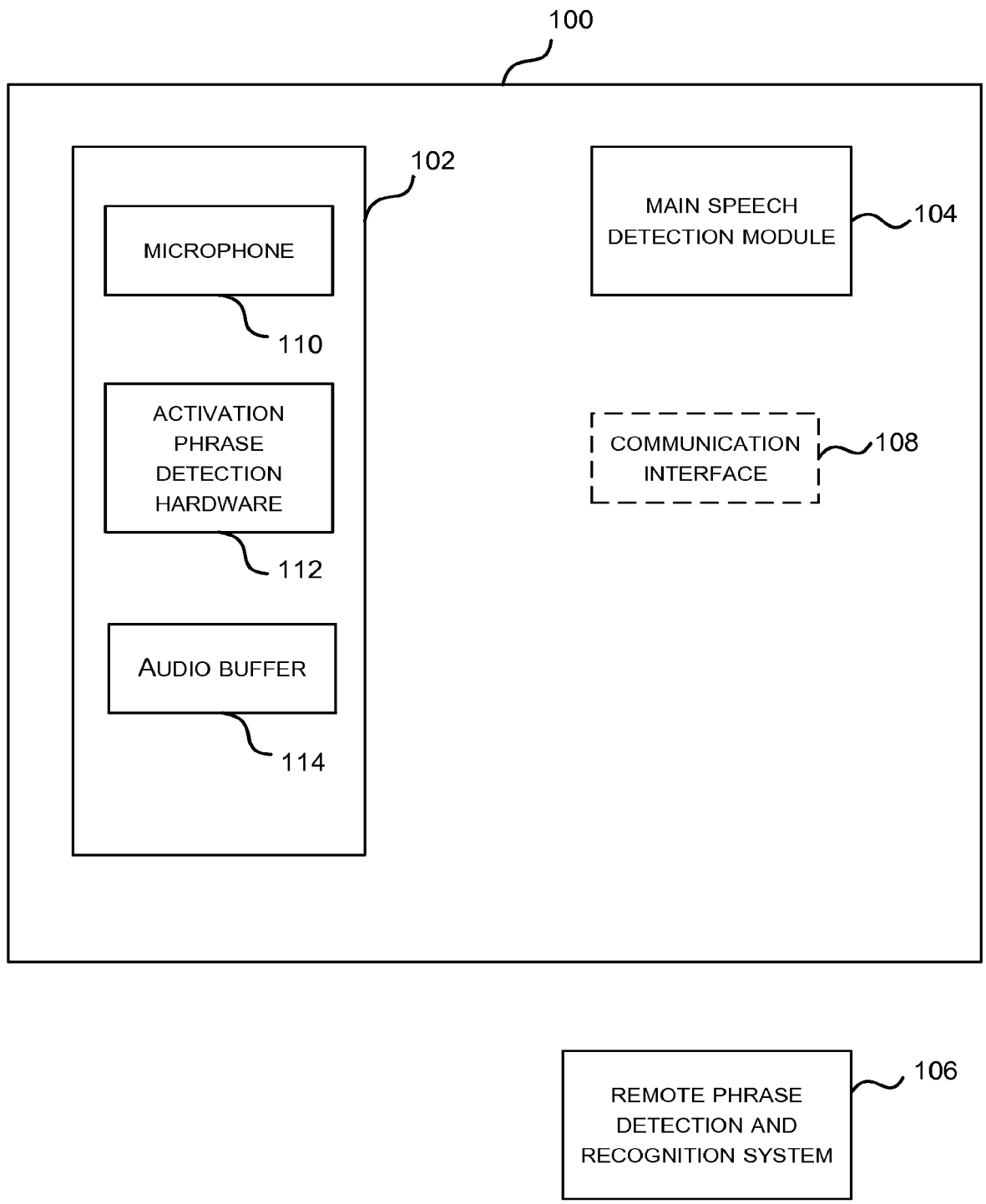
FIG. 1 is a schematic diagram showing an example computing device.

Common reference numerals are used throughout the figures to indicate similar features.

DETAILED DESCRIPTION

Embodiments of the present invention are described below by way of example only. These examples represent the best ways of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

As described above, voice control can be triggered on some electronic devices through the use of an activation phrase (such as "Hey Siri™", "OK Google™", "Hey Cortana™" or "Computer"). This means that the device must continually listen for the activation phrase. Even where the device has a low power standby state (for example with the display screen off), the device must continue to listen in order for the device to be able to respond to the activation phrase. Typically this means that the device must keep the microphone system active (in order to capture the user's voice) and also the processor must be active in order to be able to analyse the voice samples from the microphone system to detect the activation phrase. This analysis is complex and if implemented on the device consumes a lot of power which, for a battery powered device, results in reduced battery life. As a result of the complexity of the analysis (which is increased as a result of background noise, a user's distance from the microphone, etc.) some devices off-load the analysis to a remote computer; however, this requires captured voice samples to be transmitted over a data connection (e.g. a Wi-Fi™ or cellular link) and this also consumes a lot of power.

A microphone system is described herein which incorporates dedicated hardware logic configured to detect just a pre-defined activation phrase. In some examples, the hardware logic is only capable of detecting the pre-defined activation phrase and cannot perform other functionality; however, in other examples, the hardware logic may also be able to perform other functionality (e.g. to assist in detection of other phrases by packetization of audio samples).

By using dedicated hardware logic in the microphone system to perform the activation phrase detection, the processor (e.g. application CPU) within a voice controlled device can be switched off or placed into a low power state as it is not required to perform detection of the activation phrase. Furthermore, it is not necessary to use a data connection in order to detect the activation phrase as this is all done locally within the microphone system. Consequently, the battery life of a battery powered voice controlled device (e.g. a battery powered computing device such as a smart phone, tablet computer, wearable device or handheld games console) can be extended. Furthermore, as the activation phrase detection is performed locally (i.e. within the device) and in hardware, the latency of the detection process (e.g. the time from the user speaking the activation phrase to the device detecting that the activation phrase has been spoken) may be reduced.

By using dedicated hardware logic in the microphone system to perform the activation phrase detection, the phrase detection hardware can be made smaller, thereby allowing it to be incorporated as part of the microphone module. This allows the overall electronic device to be made smaller.

By using dedicated hardware logic to perform the activation phrase detection, the power consumption of the device is reduced such that in various examples, the hardware logic can continuously listen (i.e. analyse the audio stream received by the microphone). This enables a truly hands-free device as a user does not need to press a button prior to saying the activation phrase.

As the dedicated hardware logic is only capable of detecting the pre-defined activation phrase and no other phrases, this may increase the security of the voice control system (e.g. because it is harder for someone nearby to activate the device by saying the correct activation phrase), particularly where the activation phrase is set by the user or adjusted to correspond to a user's specific pronunciation of the activation phrase.

Although the microphone system described herein is described as being used in a battery powered voice controlled device, it will be appreciated that the microphone system can also be used in voice controlled devices which do not rely on an internal power source (such as a battery or supercapacitor) but instead have an external power supply (e.g. a connection to the mains electricity supply via a cable and plug).

The term 'voice controlled device' is used herein to refer to a device in which at least some of the functionality (e.g. control of a single application, control of all the functionality, etc.) can be controlled through use of voice prompts. This device may, for example, be a consumer device and/or a battery controlled device. In many examples, this device is a computing device (i.e. a device with processing capability such that it can execute instructions) and in many examples, the device is a portable computing device. Examples of voice controlled devices may include smart phones, tablet computers, portable games consoles, televisions, home appliances (e.g. coffee makers, alarm clocks), wearable devices (e.g. smart watches, smart clothing, etc.) and in-vehicle systems.

The term 'activation phrase' is used herein to refer to a trigger phrase which initiates voice control of a device. Typically the activation phrase is not the sole voice command used, but is typically followed by a 'control' or 'action' phrase. For example, a user may say "phone, navigate home" where "phone" is the activation phrase and "navigate home" is the action phrase which triggers the opening of a navigation application and the setting of the destination to 'home'. In other examples, the activation phrase may also act as the action phrase, e.g. where a device has a single function that is triggered by a voice command.

The term 'battery powered' is used herein to refer to a device which has an internal power source, such as a battery or supercapacitor, such that for at least a part of its operating time it can be powered from the internal power source and not from an external power supply (e.g. the mains electricity supply).

FIG. 1 is a schematic diagram showing an example computing device 100 which may, for example, be a battery powered computing device. The device 100 comprises a microphone system 102 which is configured to perform activation phrase detection and a main speech detection module 104 which is a more general purpose speech detection element and can detect and recognize multiple phrases. The main speech detection module 104 may be implemented on a processor (e.g. a CPU) and in some examples it may operate in conjunction with a remote phrase detection and recognition system 106 with the main speech detection module 104 transmitting voice samples to the remote system 106 using a communication interface 108.

The microphone system 102 comprises a microphone 110, an activation phrase detection hardware 112 which comprises dedicated hardware for detecting a single, pre-defined activation phrase and may also comprise an audio buffer 114. The operation of this system can be described with reference to FIG. 2.

Figure 2:
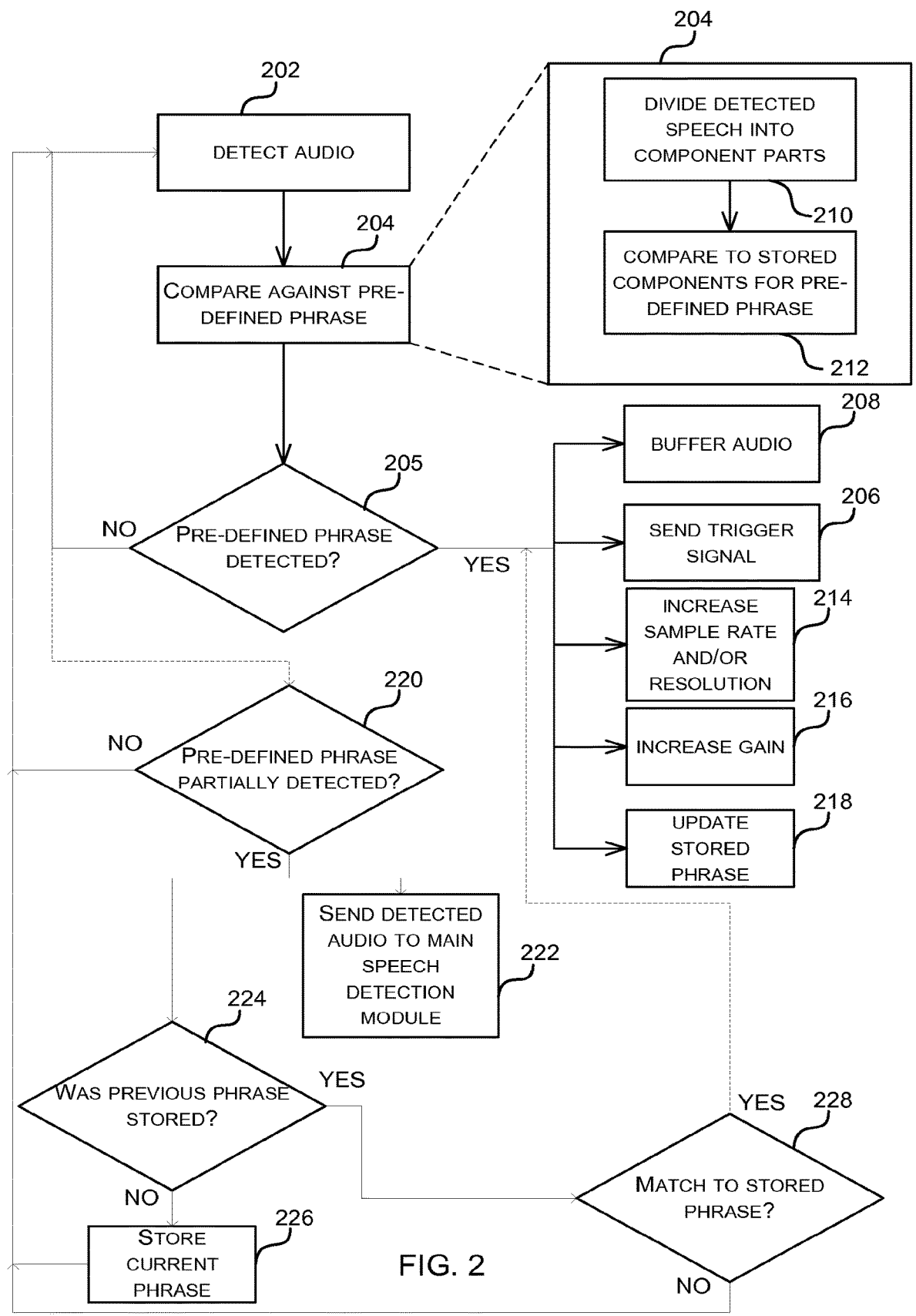
FIG. 2 is a flow diagram of an example method of operation of a microphone system.

As shown in FIG. 2, the microphone system 102 detects audio (block 202) using the microphone 110. The detected audio stream is analysed by the activation phrase detection hardware 112 to detect, if present, a pre-defined phrase (block 204). In the event that the activation phrase detection hardware 112 identifies the pre-defined phrase in the audio stream ('Yes' in block 205), the microphone system 102 (and in particular, the activation phrase detection hardware 112) sends a trigger signal to the main speech detection module 104 (block 206). This triggers operation of the main speech detection module 104 (which is not part of the microphone system 102) which may otherwise be in a low power or non-operational state. In addition to sending the trigger signal (in block 206), the microphone system 102 buffers the audio stream (by storing it in audio buffer 114) subsequent to the detected pre-defined phrase (block 208) so that it can be sent to the main speech detection module 104 once the main speech detection module is in an operational state (e.g. once the main speech detection module 104 has woken from the low power state).

As shown in FIG. 2, the detection of the pre-defined phrase within the detected audio stream (in block 204) may be performed using pattern matching. For example, the activation phrase detection hardware 112 may divide any detected audio (which may comprise speech but may in addition, or instead, comprise background noise/music, etc.) into one or more component parts (block 210), e.g. detected speech may be divided into phonemes. These component parts (generated in block 210) are then compared against stored component parts for the pre-defined phrase (block 212). If there is a match between the component parts (i.e. the same parts in the same order), then the trigger signal is sent (in block 206); however, if there is no match ('No' in block 205), a trigger signal is not sent and the activation phrase detection hardware 112 continues to analyse subsequent portions of the detected audio stream.

In some examples, however, the activation phrase detection hardware 112 may perform additional analysis in the event of a partial match between the detected audio and the pre-defined phrase. A partial match may be defined in many different ways and in various examples it may be defined as when only a proper subset of the stored components for the pre-defined phrase match (e.g. a first component matches and a second one does not) or when the result obtained by pattern matching exceeds a first lower threshold but does not exceed a second higher threshold which indicates a full match (and hence that the pre-defined phrase has been detected).

In a first example, if a partial match is detected ('Yes' in block 220) the detected audio (which resulted in the partial match) is sent to the main speech detection module 104 for processing (block 222) and this acts as a trigger signal to activate the main speech detection module from a low power state. Along with the detected audio, the activation phrase detection hardware 112 may also send details of the partial match to assist the main speech detection module 104 (e.g. an indication of which components matched and which did not match the pre-defined phrase).

In a second example, if a partial match is detected ('Yes' in block 220) the activation phrase detection hardware 112 checks whether the previous detected phrase has been stored (block 224, e.g. in a previous iteration of block 226). If the previous detected phrase (i.e. the phrase which was detected immediately prior to the current phrase being analysed) was not stored ('No' in block 224), the current phrase is stored (block 226) and the activation phrase detection hardware 112 continues to analyse subsequent portions of the detected audio stream (which, as described above, may or may not comprise speech). If, however, the previous phrase was stored ('Yes' in block 224), the current phrase is compared to this stored previous phrase and if there is a match ('Yes' in block) the activation phrase detection hardware 112 proceeds as if the pre-defined phrase was detected (e.g. as indicated by the dotted arrow from block 228 to the 'Yes' path from block 205) and sends a trigger signal (block 206), etc. If there is no match between the current phrase and the stored previous phrase, the stored previous phrase may be deleted and the activation phrase detection hardware 112 continues to analyse subsequent portions of the detected audio stream.

In the description of the second example above (and as shown in FIG. 2), a complete match may be inferred from two partial matches (e.g. where the second partial match is generated as a result of the user repeating the activation phrase because the device failed to respond to the first utterance of the activation phrase). In other examples, however, more than two partial matches may be required before a complete match is inferred.

Figure 3:
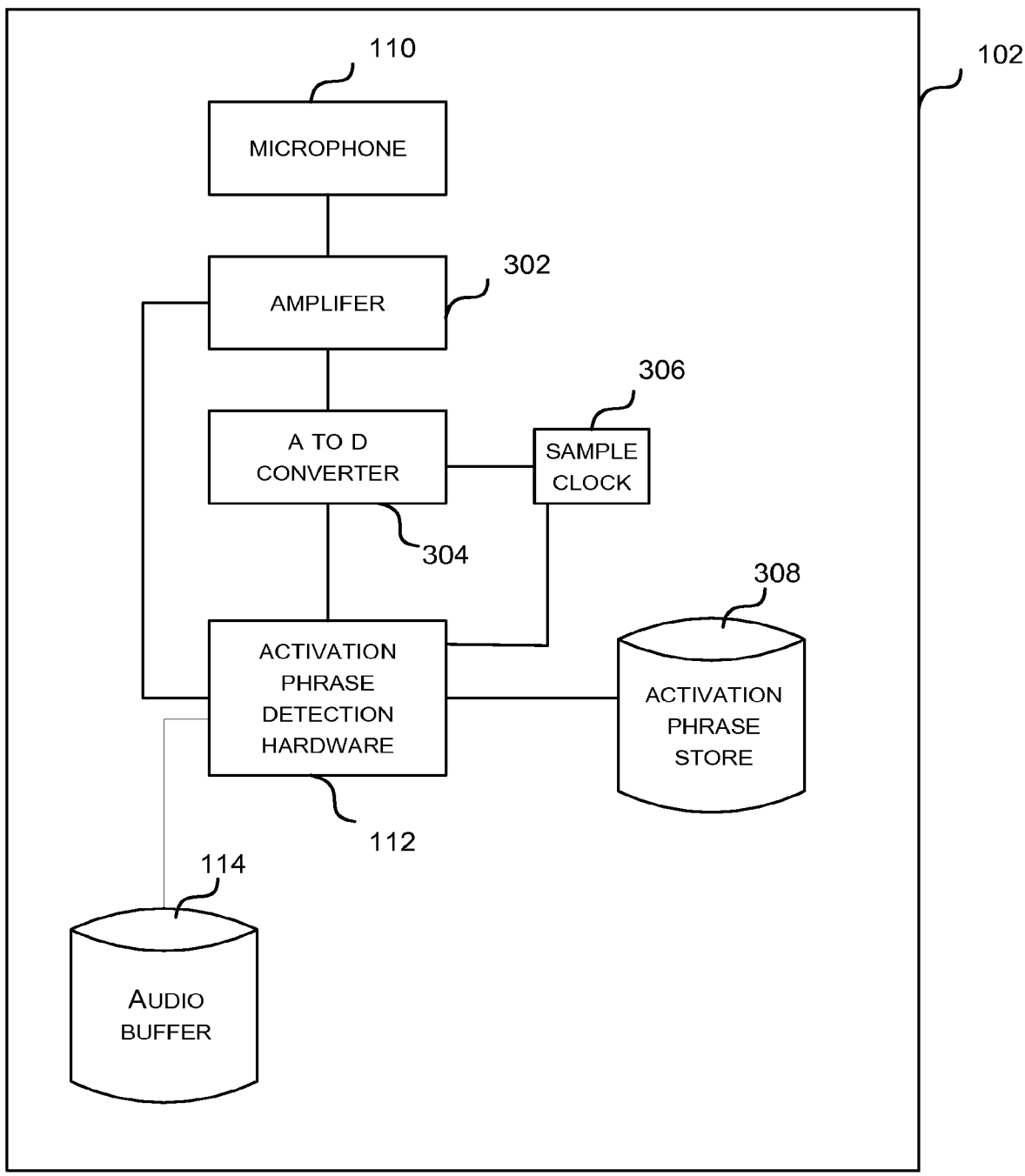
FIG. 3 is a schematic diagram showing an example microphone system in more detail.

FIG. 3 is a schematic diagram showing an example microphone system 102 in more detail. As shown in FIG. 3, the microphone system 102 comprises an amplifier 302 (which may also be referred to as a pre-amplifier) which amplifies the detected audio stream (generated by the microphone 110). The audio stream generated by the microphone 110 (and amplified by the amplifier 302) is typically an analogue signal which may then be converted into a digital signal using an analogue to digital (A to D) converter (ADC) 304. The ADC 304 samples the analogue signal at a sample rate which is defined with reference to a sample clock 306 and at a defined sample resolution (which may be defined in terms of the number of bits in each sample). The activation phrase detection hardware 112 receives the audio samples output by the ADC 304 and then analyses them to determine whether they contain the pre-defined phrase, as described above. Details of the pre-defined phrase may be stored within the microphone system 102 in an activation phrase store 308 and this may, for example, store the component parts of the pre-defined phrase for use in pattern matching (in block 212).

The activation phrase detection hardware 112 may, for example, be implemented using a digital signal processor (DSP) which is optimized for voice recognition (e.g. by removing any unused instructions from the DSP instruction set and/or replacing one or more general purpose instructions which are used in detection of the pre-defined phrase with one, or a small number of, specialised instructions which perform the same function) and where a DSP is used, this may incorporate the ADC 304 shown in FIG. 3. By reducing the instruction set of the DSP, this saves power and reduces the size of the DSP. In other examples, one or more fixed function hardware blocks may be used instead of a DSP and this may provide a more efficient implementation.

Once the pre-defined phrase has been detected (in block 204) and the operation of the main speech detection module 104 has been triggered (by the trigger signal in block 206), the activation phrase detection hardware 112 may play no further part in the speech detection until the main speech detection module 104 returns to a low power/non-operational state (e.g. when the method of FIG. 2 re-starts). In other examples, however, the activation phrase detection hardware 112 may continue to assist in speech detection even when the main speech detection module 104 is operational. In some examples this assistance may only involve sending buffered (i.e. time-delayed) audio to the main speech detection module 104. In other examples, however, the activation phrase detection hardware 112 may continue to packetize the received audio (e.g. by dividing detected audio into component parts) and provide the packetized audio samples (which may or may not comprise speech) to the main speech detection module 104 or to the communications interface 108 for transmission to a remote phrase detection and recognition system 106. This avoids duplication within the speech detection system (i.e. duplication of functionality between the activation phrase detection hardware 112 and the main speech detection module 104) and hence is more efficient in terms of power and/or space.

In various examples, the microphone system 102 (such as the one shown in FIG. 3) may operate in two modes. In a first mode the microphone system 102 performs detection of the pre-defined phrase (as described above and shown in blocks 202-204 in FIG. 2) and operates at a reduced gain (of amplifier 302) and/or reduced sample rate and/or resolution (in ADC 304) which reduces the power consumption of the microphone system 102 when operating in the first mode. Upon detection of the pre-defined phrase (in block 204), the microphone system 102 sends the trigger signal to the main speech detection module 104 (block 206), starts to buffer the audio stream (block 208) and switches to a second mode of operation by increasing the gain of the amplifier 302 (block 216), and/or the sample resolution used by the ADC, and/or the sample rate used by the ADC 304 (block 214). In various examples, the sample rate may be increased (in block 214) by increasing the speed of the sample clock 306 and in other examples, the clock speed may remain the same but how the sample clock signal is used to drive the ADC 304 may change. In this second mode, the activation phrase detection hardware 112 may be bypassed (e.g. such that the audio stream is passed to the main speech detection module 104 for analysis) or, as described above, the activation phrase detection hardware 112 may packetize the received audio and provide audio samples to the main speech detection module 104 or to the communications interface 108 for transmission to a remote phrase detection and recognition system 106. The microphone system 102 may remain in the second mode of operation until the main speech detection module 104 enters a low power state, at which point the microphone system 102 returns to the first mode of operation.

In various examples, the microphone system may adapt its operation in the first mode of operation by adjusting the gain, sample rate and/or sample resolution used. This may, for example, be implemented based on a number of partial matches which are detected (e.g. in block 220). In some examples, if the number or frequency of partial matches reached a first threshold value the gain, sample rate and/or sample resolution used may be increased. In some examples the gain, sample rate and/or sample resolution used may be decreased until the number or frequency of partial matches reaches a second threshold value or gain, sample rate and/or sample resolution used may be adapted to keep the number or frequency of partial matches within a target range. In addition, or instead, the microphone system may adapt its operation in the first mode of operation by adjusting the gain, sample rate and/or sample resolution used based on a detected level of background noise.

Through use of the two modes as described above, the power consumption of the microphone system is reduced as the system will consume less power when operating in the first mode of operation. Use of reduced gain and/or sample rate and/or sample resolution is enabled by the fact that the system is only attempting to detect a single pre-defined phrase and so the quality of the audio samples used does not need to be as high as for detection of many different phrases (e.g. as required by the main speech detection module 104).

As described above, the phrase which is detected by the activation phrase detection hardware 112 is pre-defined. In some examples it may be pre-defined and fixed (e.g. it may be factory set or set by a user when setting up the voice activated device and saved into the activation phrase store 308) and in other examples, although it is pre-defined it may vary over time.

In various examples, the activation phrase store 308 may store a plurality of different activation phrases, only one of which is 'active' at any time and therefore used in the comparison with the detected audio (e.g. in block 204). In various examples a user may be able to switch between the stored activation phrase and in other examples, the microphone may automatically switch between stored activation phrases based on contextual information.

As shown in FIG. 2, in various examples, when the pre-defined phrase is detected (in block 204), in addition to sending the trigger signal (in block 206) and buffering the audio (in block 208), the stored activation phrase, or its component parts, may be updated using the detected activation phrase (block 218). This is shown graphically in FIG. 4. As described above with reference to FIG. 2, a portion of detected audio 402 be divided into its component parts 404-407 (in block 210) e.g. into a plurality of component parts which may be the same length or different lengths. These detected audio component parts 404-407 are then compared against the stored component parts 408-410 of the pre-defined activation phrase (in block 212). In the example shown in FIG. 4, the second, third and fourth parts 405-407 of the detected audio 402 match the three component parts 408-410 of the pre-defined phrase and so a trigger signal is sent (in block 206). The stored component parts 408-410 may then be updated (in block 218) by combining, in some way, a stored component part and its corresponding detected component part, e.g. using weighted averaging. This combining operation generates updated component parts 408'-410' which are then stored and used in a subsequent comparison operation (e.g. in the next iteration of block 212).

Figure 4:
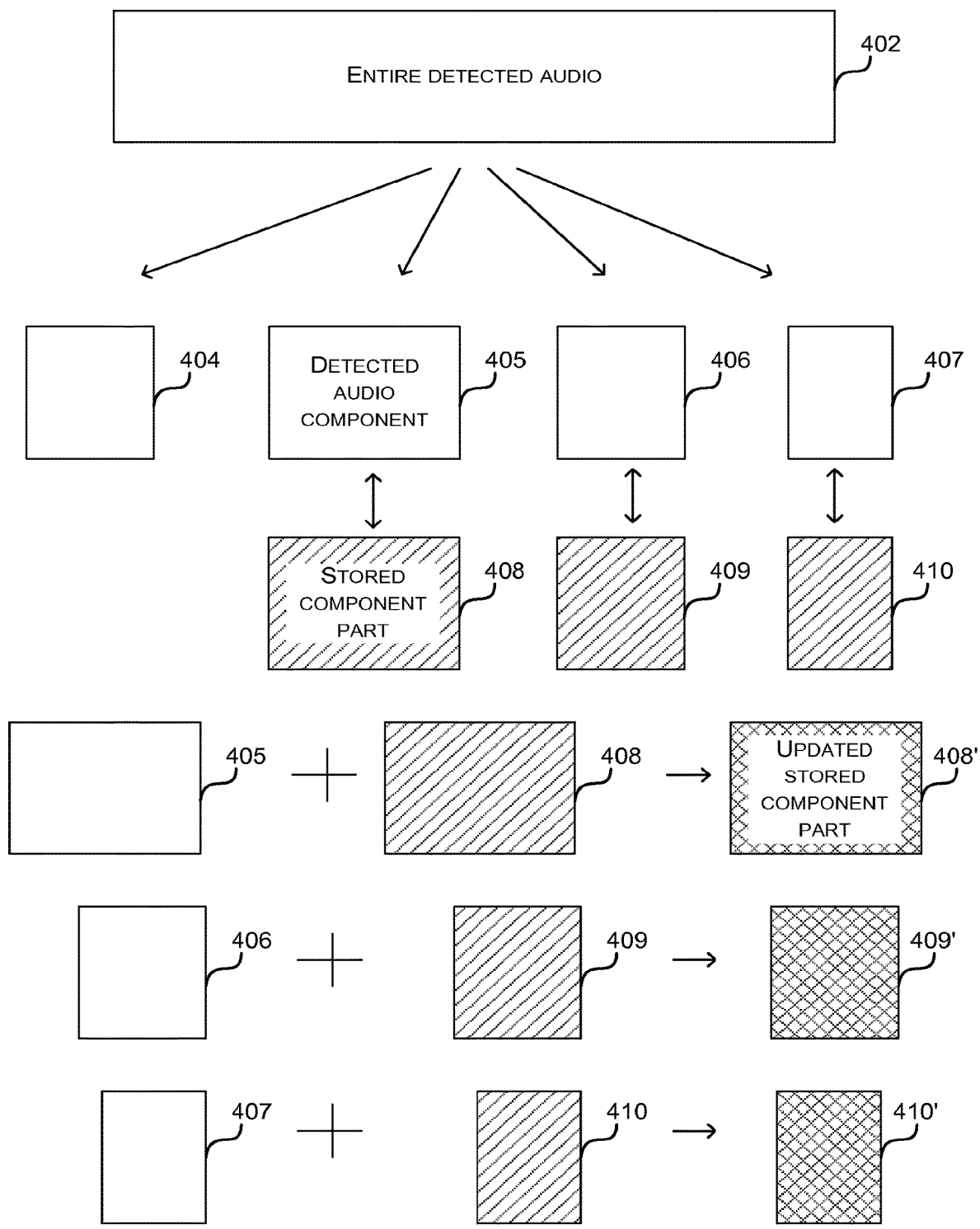
FIG. 4 is a schematic diagram showing how the stored pre-defined phrase may be updated.

Although FIG. 4 shows the updating of component parts of the pre-defined activation phrase, it will be appreciated that in other examples, the entire stored activation phrase may be updated as one element. In other examples, the stored phrase may be updated in other ways, e.g. using a machine learning algorithm.

By updating the stored activation phrase as described above, the microphone system can learn and adapt to the way a user says the particular phrase (e.g. their native language, pronunciation, accent, etc.). This increases the probability that the activation phrase detection hardware 112 can successfully detect the pre-defined activation phrase.

In various examples, any adaptation of the stored activation phrase may also be affected by other factors such as a number of partial matches or level of background noise. For example, if the number of partial matches falls below a defined threshold or a pre-defined target range, the stored activation phrase may be updated.

FIG. 4 and the description above show how the pre-defined activation phrase can be adapted over time. It will be appreciated that in addition, or instead, the pre-defined activation phrase may be replaced by an updated or new activation phrase. This may, for example, be uploaded from an external source to the activation phrase store 308 or may be recorded by the microphone system 102 when the device 100 is in a particular mode (e.g. on set-up and/or when changing the language used). This enables a user to personalize the activation phrase (which may increase the security of the device, as described above).

As described above, the microphone system 102 comprises an audio buffer 114 which is used to store detected audio (in block 208) after detection of the pre-defined phrase (in block 204) in order to accommodate the latency in the waking up of the main speech detection module 104 (e.g. so that any control or action phrase which immediately follows the activation phrase can be analysed and identified by the main speech detection module 104). In some examples, however, where the activation phrase detection hardware 112 operates in (or close to) real-time, the audio buffer 114 may not be provided. In some examples, however, the audio buffer 114 may (in addition or instead) be used to store the components of any detected audio for at least a short period of time so that this can be used for purposes other than performing the comparison with the stored pre-defined phrase (in block 212).

In an example, where the pre-defined phrase is not detected in a first portion of detected audio, the first portion of detected audio may be retained in the audio buffer 114 until at least a second portion of detected audio (e.g. a next portion of detected audio) has been analysed by the activation phrase detection hardware 112. In the event that there is no match between the second portion of detected audio and the pre-defined phrase, the second portion of detected audio may be compared to the stored first portion of detected audio (e.g. using pattern matching in a similar manner to block 212, but comparing against the stored first portion of detected audio instead of the stored components of the pre-defined phrase). In the event that there is a match between the first and second portions, a trigger signal may be sent to wake the main speech detection module 104 and at least one of the first and second portions of detected audio sent to the main speech detection module 104 (once in an operational state) for analysis.

In another example, where the pre-defined phrase is not detected in a first portion of detected audio, the first portion of detected audio may be retained in the audio buffer 114 until at least a second portion of detected audio (e.g. a next portion of detected audio) has been analysed by the activation phrase detection hardware 112. In the event that there is no match between the second portion of detected audio and the pre-defined phrase, the stored first portion of detected audio is re-examined using knowledge from the examination of the second portion. For example, if in performing the detection the portions of detected audio are compared against a first and a second component part of the pre-defined phrase and the second portion matches one of these component parts, when re-examining the first portion, the examination may focus on the other (un-matched) component part from the second portion and a match may be considered to be detected if all of the component parts can be matched in at least one of the first and second portions of detected audio. In the event that there is such a match, a trigger signal may be sent to wake the main speech detection module 104.

These variations in the method shown in FIG. 2 addresses a situation where the microphone system 102 fails to detect the activation phrase initially (e.g. due to background noise, a different user, etc.) so the user repeats the activation phrase.

Although the trigger signal (which is sent in block 206) is described above as being used to wake up the processor (e.g. CPU), it may additionally be used (or additional trigger signals may be sent) to wake up other parts of the device comprising the microphone system. For example, the trigger signal may be sent to a communication interface 108 to wake this from a low power state and/or to a display interface to turn a display screen on. In another example, the trigger signal may cause the device to make a sound (e.g. to beep) to indicate that the device is ready for further voice input.

As described above, the speech detection mechanism is split into two parts. The first part, which is implemented in hardware within the microphone system, detects only the activation phrase (and not other phrases) and the second part detects multiple phrases and may be implemented in software on a general purpose processor (e.g. on a CPU). By implementing voice control of a device in this way, it is possible for the device to enter a low power state with only the microphone system operational and still be able to respond quickly to a user that says the activation phrase, i.e. the CPU system within the device is not required to be active whilst the device is in a low power state. This reduces the power consumption of the device and hence increases the battery life, where the device is battery powered.

As the activation phrase detection hardware 112 is located within the microphone system 102, it is close to the microphone interface. This allows the device to be made smaller and additionally enables phrase detection to be incorporated into simpler devices that do not have a high performance CPU (which acts as the main speech detection module) or even a CPU system at all. For example, the microphone system 102 could be implemented into a light bulb or light switch (e.g. with a pre-defined phrase of 'light' or 'light-switch'). In such an example, the trigger signal (sent in block 206) is not used to wake a main speech detection module but is instead used to control a part of the device (e.g. to trigger the light bulb to turn on/off).

The description above referred to use of an activation phrase which comprises one or more spoken words and various examples were provided (e.g. generic phrases such as 'computer' or 'sat nav' or platform specific phrases such as "Hey Siri™", "OK Google™" and "Hey Cortana™"). In further examples, the activation phrase may comprise any pre-defined sound (e.g. a contextual sound) and may not comprise spoken words. For example, the methods described above may be used with a baby-monitoring application and the pre-defined activation phrase may be an audio sample of a baby crying. In such an example, the pre-defined activation phrase (e.g. in the form of a contextual sound such as a baby crying) may, like the light bulb example above, be used to trigger operation of another part of the device which is external to the microphone system (but which is not a main speech detection module). Further examples of contextual sounds which may be used as a pre-defined activation phrase include traffic/road noise (e.g. for a vehicle based application of the methods described herein).

The term 'processor' and 'computing device' (or 'computer') are used herein to refer to any device, or portion thereof, with processing capability such that it can execute instructions. The term 'processor' may, for example, include central processing units (CPUs), graphics processing units (GPUs or VPUs), physics processing units (PPUs), radio processing units (RPUs), digital signal processors (DSPs), general purpose processors (e.g. a general purpose GPU), microprocessors, any processing unit which is designed to accelerate tasks outside of a CPU, etc. Those skilled in the art will realize that such processing capabilities are incorporated into many different devices and therefore the term 'computing device' includes set top boxes, media players, digital radios, digital televisions, PCs, servers, mobile telephones, personal digital assistants and many other devices.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Memories storing machine executable data for use in implementing disclosed aspects can be non-transitory media. Non-transitory media can be volatile or non-volatile. Examples of volatile non-transitory media include semiconductor-based memory, such as SRAM or DRAM. Examples of technologies that can be used to implement non-volatile memory include optical and magnetic memory technologies, flash memory, phrase change memory, resistive RAM.

The methods described herein may be performed by a computer configured with software in machine readable form stored on a tangible storage medium e.g. in the form of a computer program comprising computer readable program code for configuring a computer to perform the constituent portions of described methods or in the form of a computer program comprising computer program code means adapted to perform all the steps of any of the methods described herein when the program is run on a computer and where the computer program may be embodied on a computer readable storage medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

It is also intended to encompass software which "describes" or defines the configuration of hardware that implements a module, functionality, component or logic described above, such as HDL (hardware description language) software, as is used for designing integrated circuits, or for configuring programmable chips, to carry out desired functions. That is, there may be provided a computer readable storage medium having encoded thereon computer readable program code for generating a processing unit configured to perform any of the methods described herein, or for generating a processing unit comprising any apparatus described herein. That is, a computer system may be configured to generate a representation of a digital circuit from definitions of circuit elements and data defining rules for combining those circuit elements, wherein a non-transitory computer readable storage medium may have stored thereon processor executable instructions that when executed at such a computer system, cause the computer system to generate a processing unit as described herein.

A particular reference to "logic" refers to structure that performs a function or functions. An example of logic includes circuitry that is arranged to perform those function(s). For example, such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnect, by way of example. Such elements may be provided as custom circuits or standard cell libraries, macros, or at other levels of abstraction. Such elements may be interconnected in a specific arrangement. Logic may include circuitry that is fixed function and circuitry can be programmed to perform a function or functions; such programming may be provided from a firmware or software update or control mechanism. Logic identified to perform one function may also include logic that implements a constituent function or sub-process. In an example, hardware logic has circuitry that implements a fixed function operation, or operations, state machine or process.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and an apparatus may contain additional blocks or elements and a method may contain additional operations or elements. Furthermore, the blocks, elements and operations are themselves not impliedly closed.

The steps of the methods described herein may be carried out in any suitable order, or simultaneously where appropriate. The arrows between boxes in the figures show one example sequence of method steps but are not intended to exclude other sequences or the performance of multiple steps in parallel. Additionally, individual blocks may be deleted from any of the methods without departing from the spirit and scope of the subject matter described herein. Aspects of any of the examples described above may be combined with aspects of any of the other examples described to form further examples without losing the effect sought. Where elements of the figures are shown connected by arrows, it will be appreciated that these arrows show just one example flow of communications (including data and control messages) between elements. The flow between elements may be in either direction or in both directions.

It will be understood that the above description of a preferred embodiment is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the spirit or scope of this invention.

What is claimed is:

1. A voice controlled device, comprising:
    a main speech detection module configured to detect multiple phrases; and
    a microphone system comprising a microphone and dedicated hardware logic configured to:
        detect only a pre-defined activation phrase by comparing an audio stream received via the microphone with the pre-defined activation phrase, and
        in response to detecting the pre-defined activation phrase in the audio stream, to send a trigger signal to activate the main speech detection module from a switched-off or low power state;
    wherein the main speech detection module is external to the microphone system and the activation phrase detection is performed locally within the microphone system.

2. The voice controlled device of claim 1, wherein the microphone system is further configured to compare the audio stream received via the microphone with the pre-defined activation phrase in a first mode of operation, and, in response to detecting the pre-defined activation phrase in the audio stream, the microphone system is further configured to buffer the audio stream and switch to a second mode of operation.

3. The voice controlled device of claim 2, wherein the second mode of operation comprises sending a signal to at least one of an amplifier and an analogue to digital converter to adjust at least one of a gain parameter, a sample rate, and a sample resolution.

4. The voice controlled device of claim 3, wherein the at least one of the gain parameter, sample rate, and sample resolution is increased in the second mode of operation compared to the first mode of operation.

5. The voice controlled device of claim 2, wherein the microphone system remains in the second mode of operation until the main speech detection module enters a low power state, at which point the microphone systems returns to the first mode of operation.

6. The voice controlled device of claim 2, wherein the main speech detection module is configured to detect the multiple phrases in the second mode of operation based on the audio stream.

7. The voice controlled device of claim 6, wherein, in the second mode of operation, the dedicated hardware logic packetizes the audio stream to provide audio samples and the main speech module is configured to detect the multiple phrases based on the audio samples.

8. The voice controlled device of claim 2, wherein the microphone system is further configured to adjust at least one of a gain parameter, a sample rate, and a sample resolution in the first mode of operation.

9. The voice controlled device of claim 8, wherein the adjustment of the gain parameter, sample rate, and/or sample resolution is based on a detected level of background noise.

10. The voice controlled device of claim 8, wherein the adjustment of the gain parameter, sample rate, and/or sample resolution is used to keep the number or frequency of partial matches within a range.

11. The voice controlled device of claim 10, wherein the adjustment of the gain parameter, sample rate, and/or sample resolution is based on detecting one or more partial matches with the pre-defined activation phrase in the audio stream.

12. The voice controlled device of claim 11, wherein the adjustment of the gain parameter, sample rate, and/or sample resolution is increased if the number or frequency of detected partial matches reaches a first threshold.

13. The voice controlled device of claim 11, wherein the adjustment of the gain parameter, sample rate, and/or sample resolution is decreased if the number or frequency of detected partial matches reaches a second threshold.

14. The voice controlled device of claim 1, wherein the microphone system is further configured to compare the audio stream received via the microphone with the pre-defined activation phrase in a first mode of operation, and is further configured to switch to a second mode of operation in response to detecting the pre-defined activation phrase in the audio stream, wherein the main speech detection module is configured to detect the multiple phrases in the second mode of operation based on the audio stream and wherein, the dedicated hardware logic is bypassed and the main speech detection module receives the audio stream directly from the microphone in the second mode of operation.

15. The voice controlled device of claim 1, wherein the hardware logic is configured to divide a portion of detected audio into one or more component parts and to compare the component parts to one or more stored component parts of the pre-defined phrase.

16. The voice controlled device of claim 1, comprising an activation phrase store arranged to store the pre-defined phrase.

17. The voice controlled device of claim 16, wherein the hardware logic is further configured, in response to detecting the pre-defined phrase, to update the stored pre-defined phrase using the detected pre-defined phrase.

18. The voice controlled device of claim 1, wherein the pre-defined phrase is a sample of a contextual sound and/or comprises one or more spoken words.

19. The voice controlled device of claim 1, wherein the hardware logic is configured to continuously analyse the audio stream received via the microphone to detect the pre-defined phrase.

20. The voice controlled device of claim 1, wherein the main speech detection module is implemented by a processor.

* * * * *